United States Patent
Pedut et al.

[11] Patent Number: 5,383,645
[45] Date of Patent: Jan. 24, 1995

[54] STABILIZED PAYLOAD

[75] Inventors: Hai Pedut, Haifa; Zvi Yavin, Misgav; Shlomo Djerassi, Nahariya; Avihu Goral, Misgav, all of Israel

[73] Assignee: State of Israel-Ministry of Defence Armament Development Authority, Rafael, Haifa, Israel

[21] Appl. No.: 878,729

[22] Filed: May 4, 1992

[30] Foreign Application Priority Data
Jan. 12, 1992 [IL] Israel .................................. 100.634

[51] Int. Cl.$^6$ .............................................. F16M 1/00
[52] U.S. Cl. ..................................... 248/637; 248/550
[58] Field of Search ................ 248/637, 610, 612, 550, 248/178, 183, 185, 186; 89/41.09; 318/689, 648; 74/479 R

[56] References Cited

U.S. PATENT DOCUMENTS

| | | | |
|---|---|---|---|
| 4,318,522 | 3/1982 | Appleberry | 248/178 |
| 4,498,038 | 2/1985 | Malueg | 248/550 X |
| 4,919,382 | 4/1990 | Forman | 248/178 |
| 4,951,521 | 8/1990 | Jacobson | 248/183 X |

Primary Examiner—Ramon O. Ramirez
Attorney, Agent, or Firm—Helfgott & Karas

[57] ABSTRACT

A stabilized payload including:
a first gimbal arranged for rotation about a first axis and mounted onto a support;
a dual gimbal mounting assembly supported on the first gimbal for supporting a sensor; and
an environmental protective housing mounted on the first gimbal and enclosing the dual gimbal mounting assembly.

4 Claims, 8 Drawing Sheets

STABILIZED PAYLOAD

FIELD OF THE INVENTION

The present invention relates generally to stabilized payloads.

BACKGROUND OF THE INVENTION

Various types of stabilized payloads are known in the art. These include payloads which are supported by multiple gimbals and which have protective housings. Generally, however, the protective housings are mounted interior of the gimbals and thus the gimbals are exposed to the environment.

SUMMARY OF THE INVENTION

The present invention seeks to provide an improved stabilized payload.

There is thus provided in accordance with a preferred embodiment of the present invention a stabilized payload including:
- a first gimbal arranged for rotation about a first axis and mounted onto a support;
- a dual gimbal mounting assembly supported on the first gimbal for supporting a sensor; and
- an environmental protective housing mounted on the first gimbal and enclosing the dual gimbal mounting assembly.

There is also provided in accordance with a preferred embodiment of the invention a stabilized payload including:
- a first gimbal arranged for rotation about a first axis and mounted onto a support;
- a dual gimbal mounting assembly supported on the first gimbal for supporting a sensor; and
- damping apparatus arranged intermediate the first gimbal and the dual gimbal mounting assembly.

Preferably an environmental protective housing is mounted on the first gimbal and enclosing the dual gimbal mounting assembly.

Preferably a sensor is mounted on the dual gimbal mounting assembly.

Additionally in accordance with a preferred embodiment of the present invention there is provided a FLIR including:
- scanning apparatus for receiving light from a field of view and focusing it onto a detector focal plane; and
- a detector array arranged in the detector focal plane for imagewise detection of the light focused thereonto,
- and wherein the scanning apparatus includes autofocus apparatus comprising:
- a focusing lens;
- a linear stepper motor providing desired axial displacement along an axis; and
- a unitary element transmitting the motion of the linear stepper motor to the focusing lens for providing movement thereof along the axis.

In accordance with a preferred embodiment of the present invention, the linear stepper motor operates in an open loop.

Further in accordance with a preferred embodiment of the invention there is provided a FLIR including:
- a unitary chassis;
- a nodding mirror mounted onto the unitary chassis for directing light from the nodding mirror to a detector focal plane; and
- detector apparatus mounted onto the unitary chassis to lie in the detector focal plane.

Preferably there is also provided apparatus for providing an output indication of the orientation of the nodding mirror.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
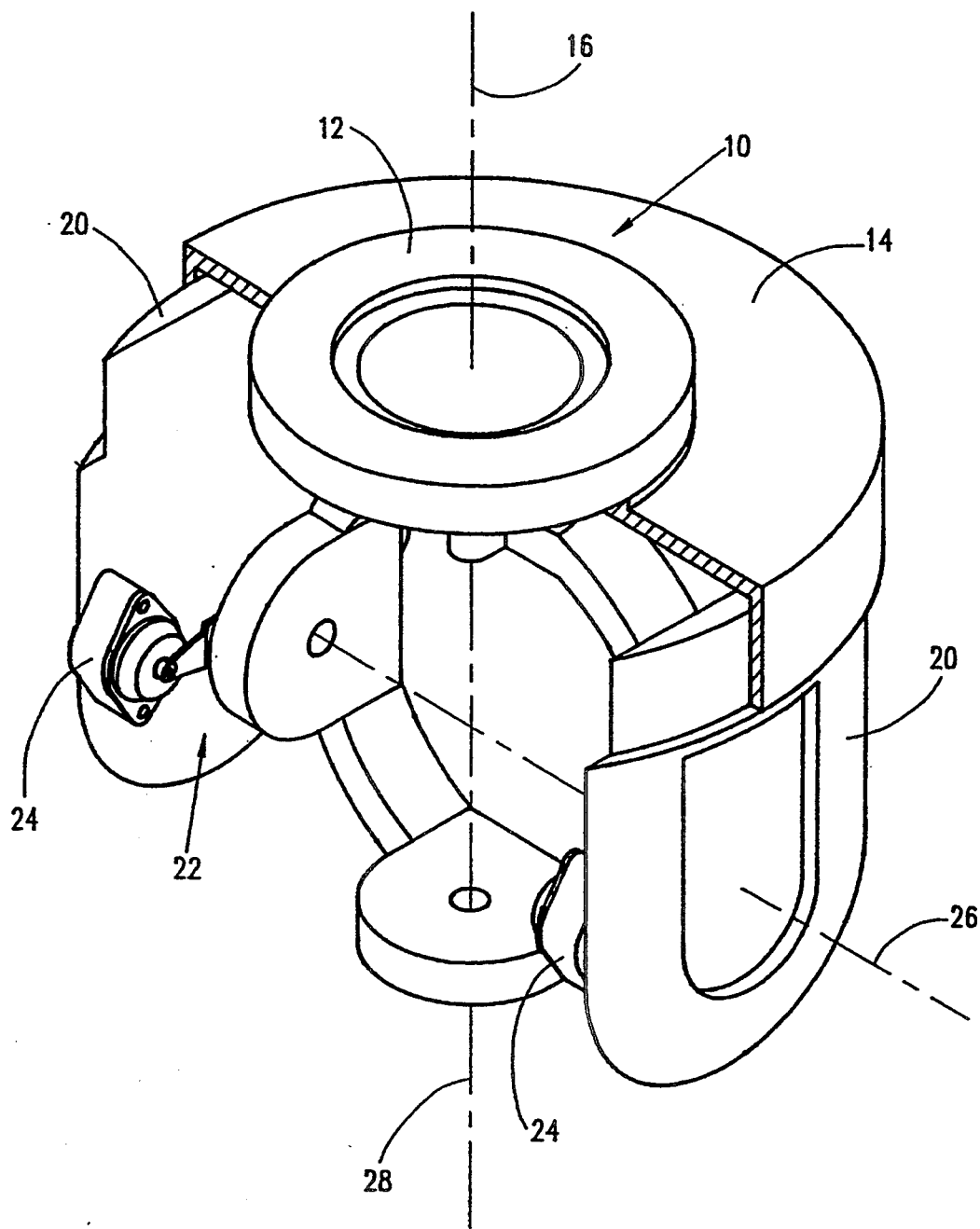
FIGS. 1A and 1B are generalized pictorial illustrations of a stabilized payload constructed and operative in accordance with a preferred embodiment of the present invention, FIG. 1A illustrating the stabilizing mechanism without a FLIR mounted therein and FIG. 1B illustrating the mechanism with a FLIR mounted therein.
Figure 1B:
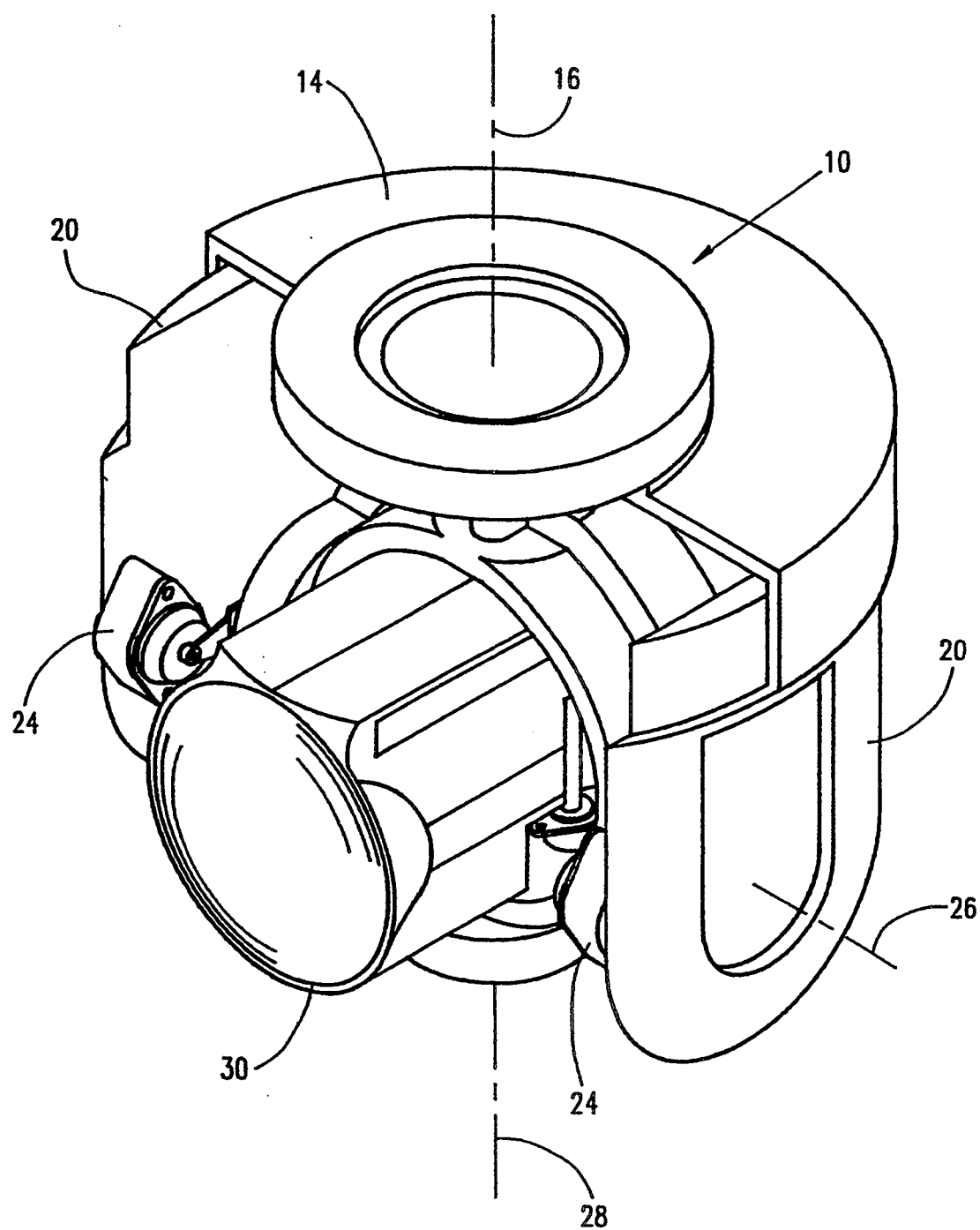
Figure 1C:
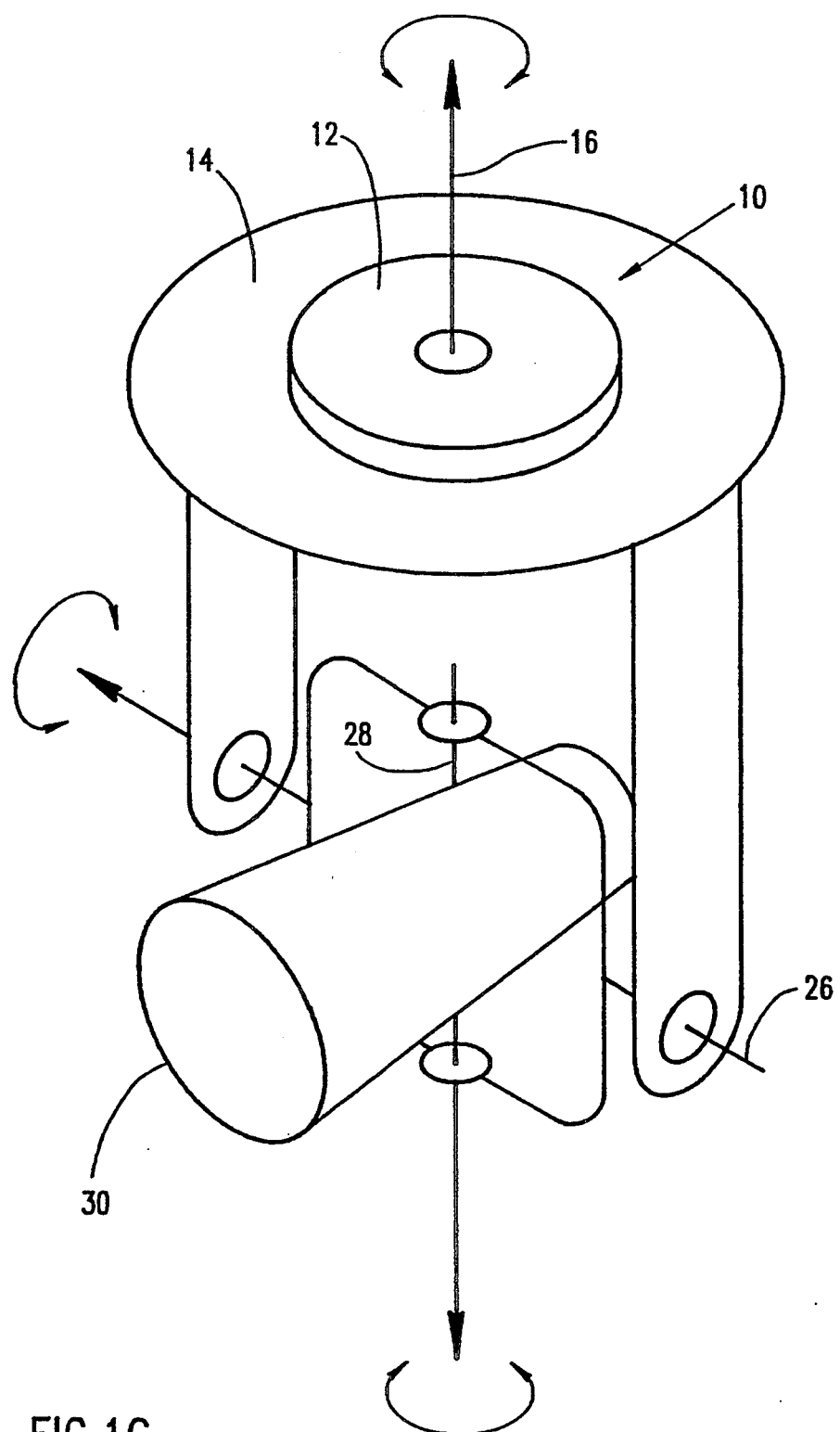
FIG. 1C is a diagrammatic illustration of the orientation of the various gimbals in the apparatus of FIGS. 1A and 1B.
Figure 1D:
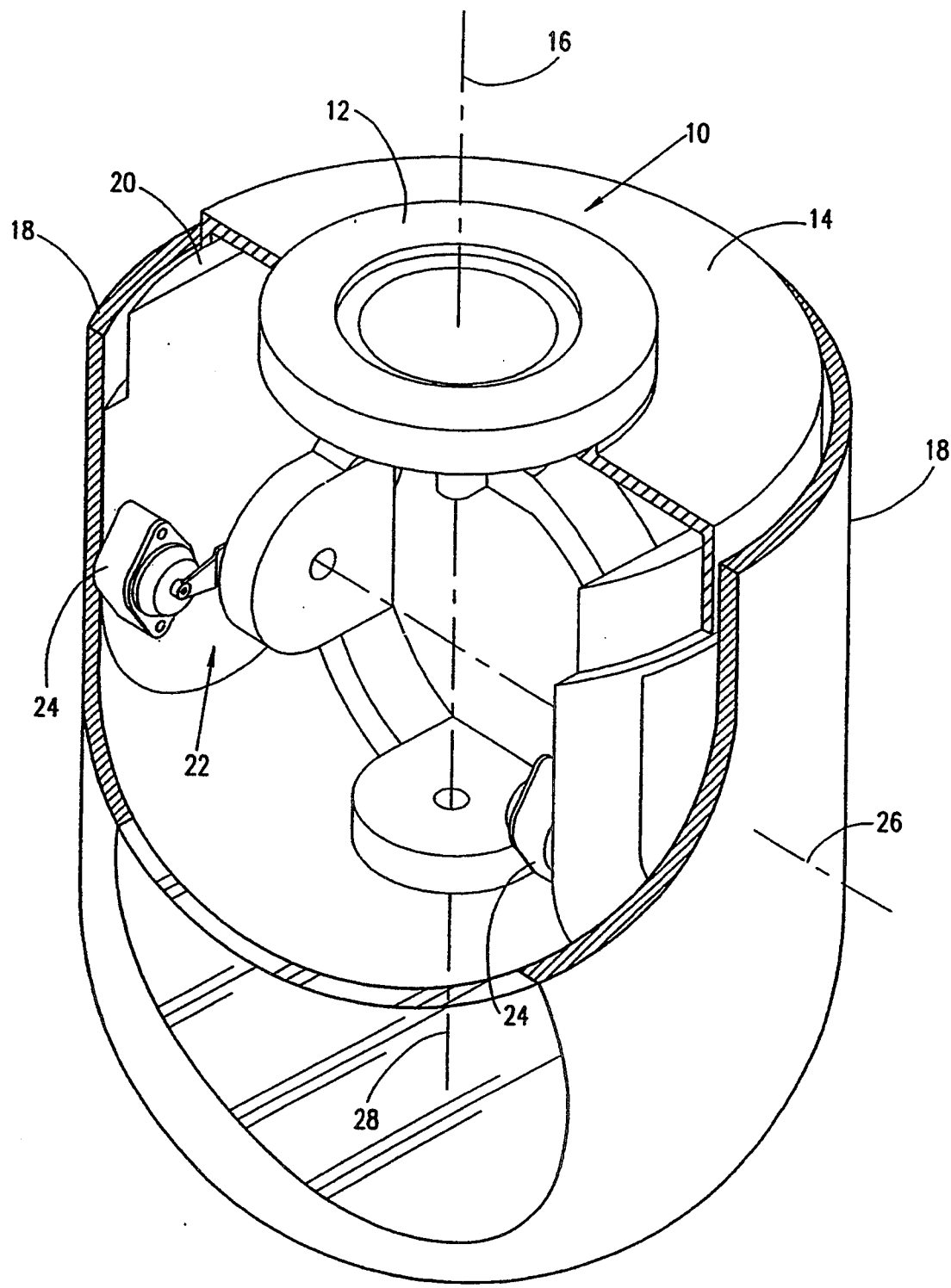
FIG. 1D is a partly cut-away, pictorial, illustration of the stabilized payload of FIG. 1A, having an environmental protective housing mounted thereon.
Figure 2:
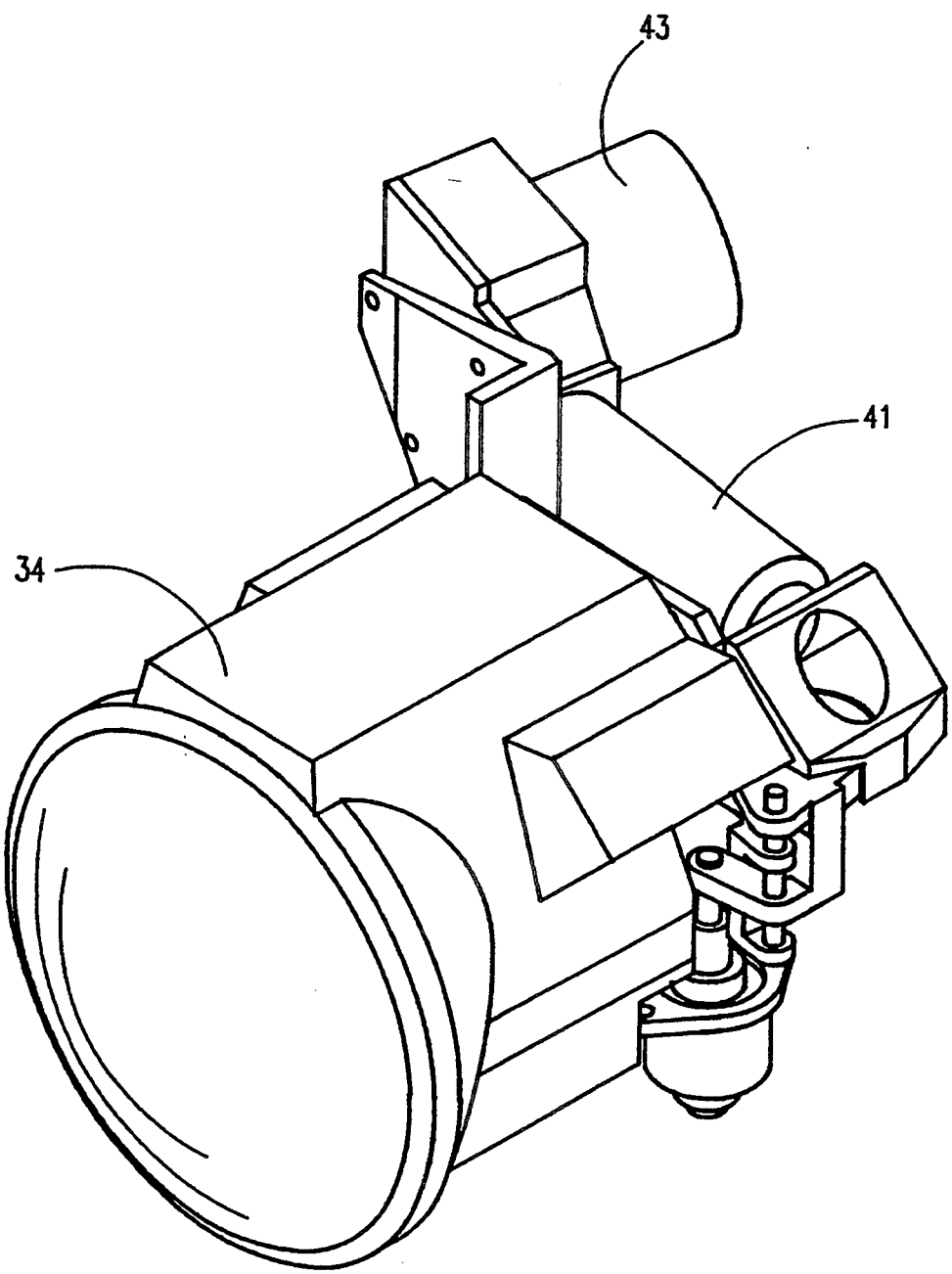
FIG. 2 is a generalized pictorial illustration of a FLIR which may form part of the stabilized payload of FIGS. 1A-1C.

Reference is now made to FIGS. 1A-1D, which illustrate a stabilized payload constructed and operative in accordance with a preferred embodiment of the present invention. The stabilized payload comprises a first and outer gimbal assembly 10, preferably including a mounting portion 12 which is arranged to be mounted onto a support surface of a vehicle (not shown) and a rotating portion 14 which is arranged to rotate freely with respect to mounting portion 12, preferably through 360 degrees about a first rotation axis 16.

In accordance with a preferred embodiment of the present invention, an environmental housing 18 (FIG. 1D) is mounted on the rotating portion 14 of the first gimbal. The environmental housing provides protection from external elements and forces, such as dust, liquids and wind.

In accordance with a preferred embodiment of the present invention, second and third gimbal assemblies indicated generally by reference numeral 22 are mounted via mechanical dampers 24 onto gimbal portion 14 via fork 20.

The second and third gimbal assemblies may be of conventional construction and define respective second and third rotational axes 26 and 28.

In accordance with a preferred embodiment of the invention, a FLIR 30 is mounted onto the second and third gimbal assemblies. It is appreciated that the present invention is not limited to mounting of FLIRs and is applicable to the gimballed mounting of any suitable payload device.

Figure 3:
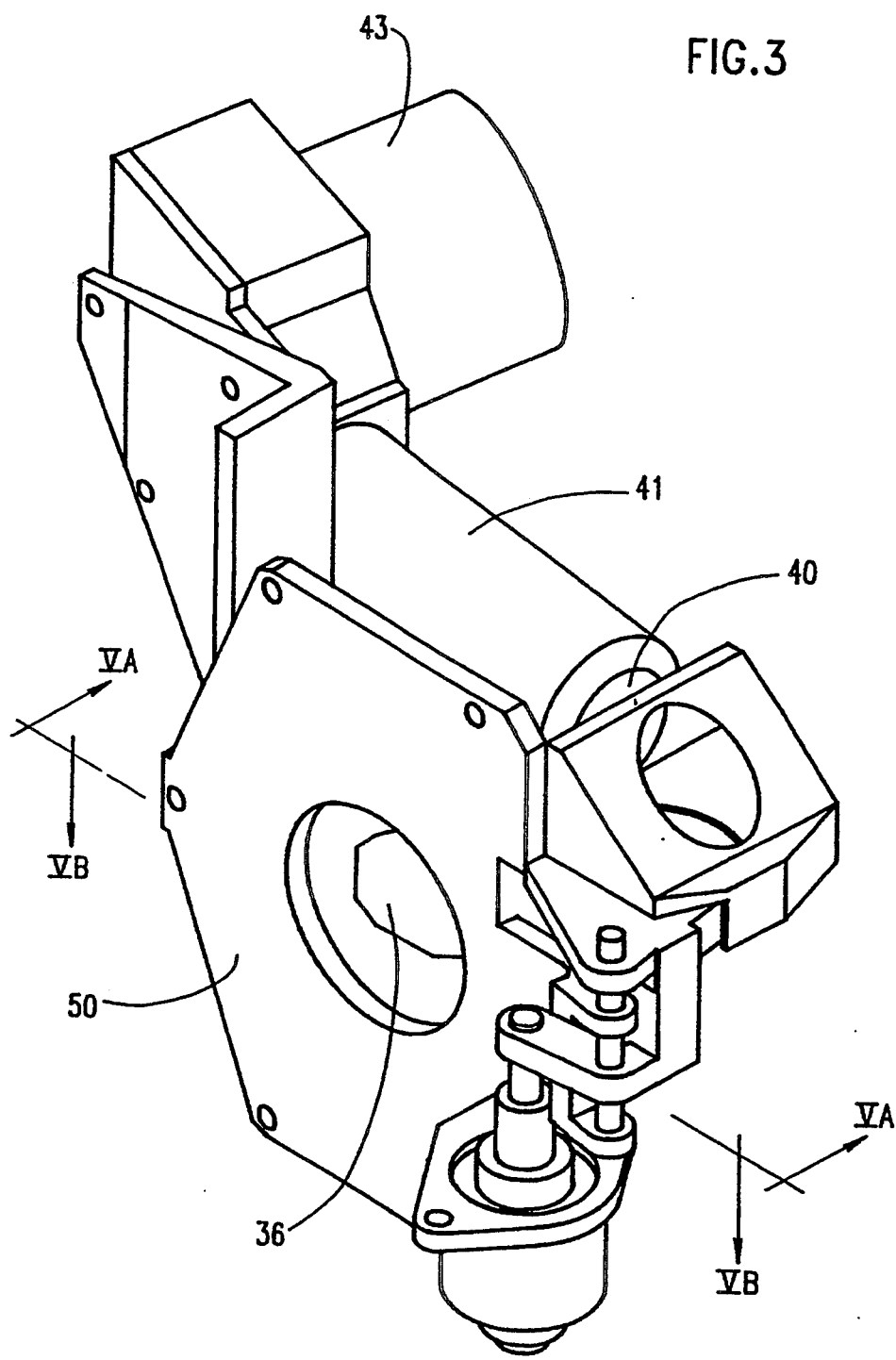
FIG. 3 is an illustration of part of the imager of the FLIR of FIG. 2.

Reference is now made to FIGS. 2–5B, which illustrate a preferred embodiment of FLIR 30. As seen in FIG. 3, the FLIR 30 comprises a telescope 34, preferably a dual field of view telescope, which receives infrared energy from a field of view and directs it onto a scanning mirror 36, also termed a nodding mirror, which scans the field of view and transmits radiation received therefrom via a focusing lens 38 to an infra-red detector 40, which is associated with a dewar 41 and cooler 43.

Figure 4:
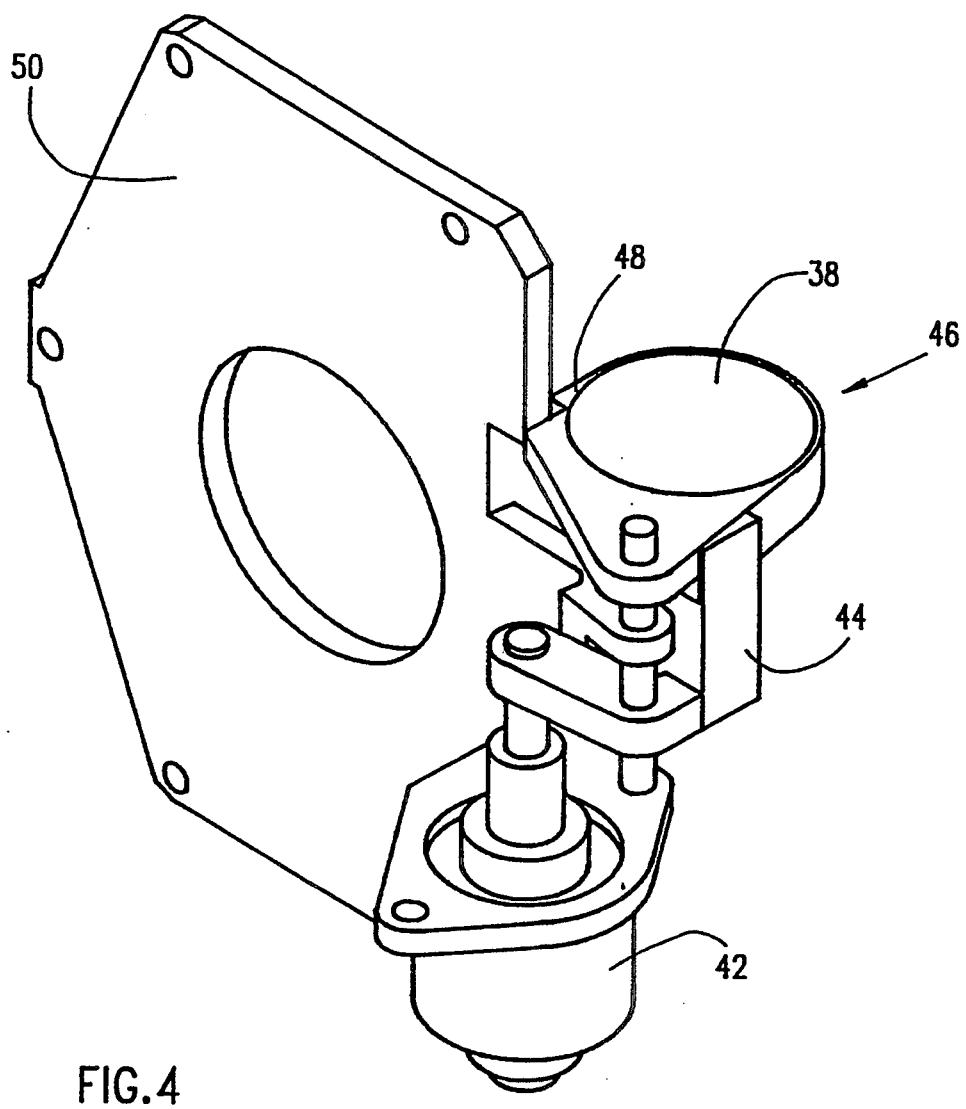
FIG. 4 is an illustration of a focusing mechanism forming part of the apparatus of FIGS. 2 and 3.

In accordance with a preferred embodiment of the invention, the FLIR 30 includes an autofocus mechanism, illustrated in FIG. 4 and which comprises a linear stepper motor 42 which provides desired axial displacement along an axis. The stepper motor 42 drives a unitary displacement member 44 in corresponding linear motion and serves as a support for a focusing lens 38.

It is also a particular feature of the present invention, that a unitary chassis 50 is employed for mounting not only the scanner mirror 36 but also the entire auto-focus mechanism.

Figure 5A:
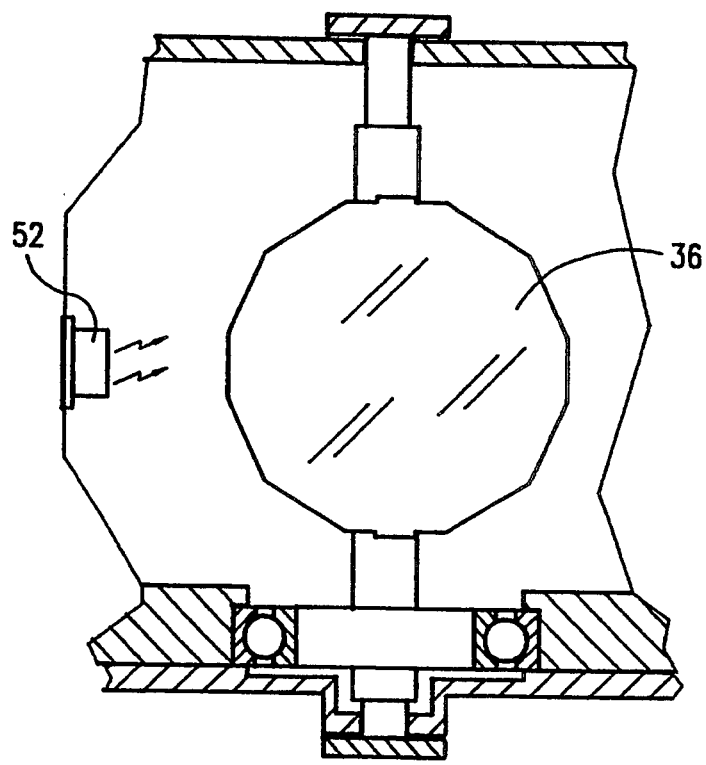
FIGS. 5A and 5B are sectional illustrations taken along lines A and B of FIG. 3 and illustrating scanning apparatus forming part of the apparatus of FIGS. 2 and 3.
Figure 5B:
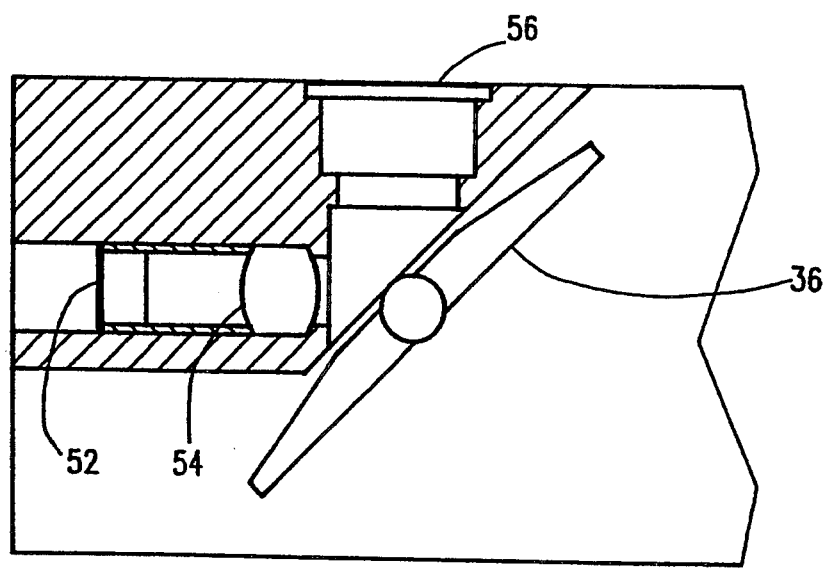

As seen in FIGS. 5A and 5B, the orientation of the scanning mirror 36 may be sensed by means of a light source such as an LED 52 and associated lens 54 which may produce a beam of light which impinges on the mirror 36 and is reflected thereby to a suitable detector 56, such as a two-halves detector. The sensed orientation of the scanning mirror 36 may be employed in feedback and control electronics for correlating the scanning produced by mirror 36 with the image detection provided by the FLIR.

It will be appreciated by persons skilled in the art that the present invention is not limited by what has been particularly shown and described hereinabove. Rather, the scope of the present invention is defined only by the claims which follow:

We claim:

1. A stabilized payload comprising:
   a first gimbal arranged for rotation about a first axis and mounted onto a support;
   a dual gimbal mounting assembly supported on said first gimbal for supporting a sensor; and
   damper arranged intermediate said first gimbal and said dual gimbal mounting assembly.

2. Apparatus according to claim 1 and also comprising a sensor mounted on said dual gimbal mounting assembly.

3. Apparatus according to claim 1 and also comprising an environmental protective housing mounted on said first gimbal and enclosing said dual gimbal mounting assembly.

4. Apparatus according to claim 2, wherein the sensor is a FLIR.

* * * * *